Dec. 12, 1961 L. G. FISCHER 3,013,264

RADIO RANGE RECEIVER SYSTEM

Filed Sept. 26, 1951 2 Sheets-Sheet 1

INVENTOR
LAURIN G. FISCHER
BY Percy P. Lantzy
ATTORNEY

Dec. 12, 1961 L. G. FISCHER 3,013,264

RADIO RANGE RECEIVER SYSTEM

Filed Sept. 26, 1951 2 Sheets-Sheet 2

INVENTOR
LAURIN G. FISCHER
BY Percy P. Lantzy
ATTORNEY 3,013,264
RADIO RANGE RECEIVER SYSTEM
Laurin G. Fischer, North Arlington, N.J., assignor to International Telephone and Telegraph Corporation, a corporation of Maryland
Filed Sept. 26, 1951, Ser. No. 248,344
12 Claims. (Cl. 343—106)

This invention relates to omnidirectional radio range systems and more specifically to methods for reducing the error due to a major reflection.

Present radio range systems are considerably troubled by errors due to reflections of the transmitted signal and particularly where no attempt is made to correct or to compensate for these errors. The bearing indication systems might be incorrect by 20° or more. Heretofore it has not been possible to completely and conveniently eliminate the bearing error due to a major reflection.

Therefore, one of the principal objects of this invention is to eliminate substantially completely the error due to a major reflection in an omnidirectional radio range.

Another object of this invention is to automatically adjust an omnidirectional radio range receiver so as to have said receiver determine the bearing to the signal source free of any error due to a major reflection.

A further object of this invention is to provide a true bearing reading that is free of all error due to a major reflection without the use of a cathode ray oscilloscope.

A further object of this invention is to provide an omnidirectional radio range system free of any error due to a major reflection using only a single rotating antenna array.

According to a feature of my invention, a source of radio frequency is used to radiate energy over an area wherein is located the receiver equipment. The receiver and associated equipment serves to ascertain the voltage measurements necessary to calculate the bearing of the transmitter equipment, free of any error due to any one major reflection. Equipment responsive to these measurements can be used to adjust the bearing indication so that it reads the true azimuth to the transmitter from the receiver.

The above-mentioned and other features and objects of this invention will become more apparent by reference to the following description taken in conjunction with the accompanying drawings, in which.

Figure 1:
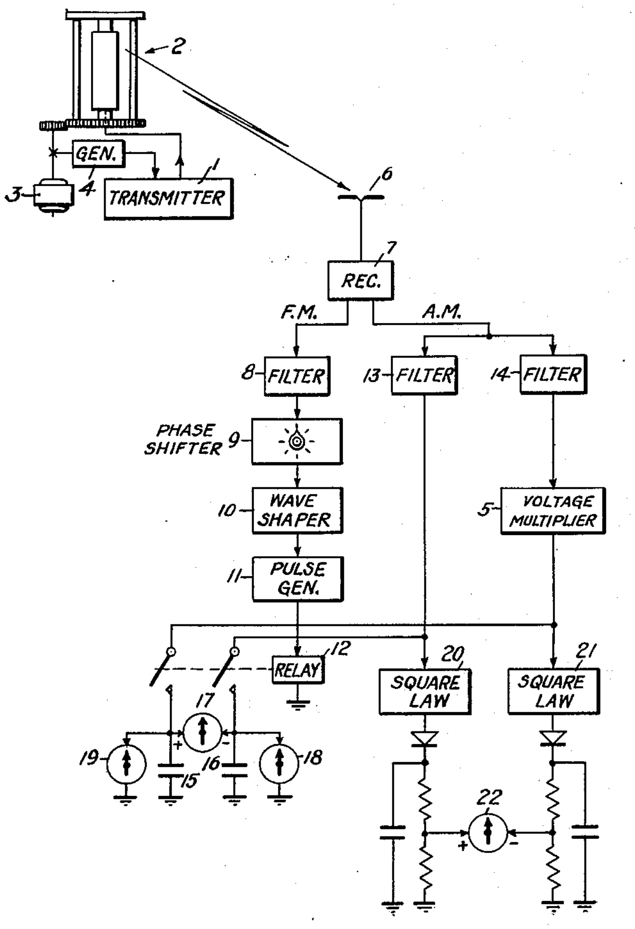
FIG. 1 is a schematic illustration partly in block form of one embodiment of this invention.

Referring now to FIG. 1, the transmitter 1 feeds the rotating antenna system 2 which by well-known means is made to radiate a cardioid pattern with a cophasal harmonic ripple such that the amplitudes of the fundamental and one of its harmonics are equal. A motor 3 drives the antenna system and a signal voltage generator 4. It is possible to use any voltage ratio provided appropriate corrections are made in the receiving system. Such appropriate corrections might take the form of a voltage multiplier 5 in the harmonic frame such as to multiply the harmonic voltage by the ratio of the fundamental to the harmonic as transmitted. However, equal amplitudes will provide the simplest system.

Assume for purposes of explanation that the amplitude of the third harmonic and the fundamental are made equal. A generator 4 operatively connected to the antenna motor 3 provides a bearing reference signal which modulates the transmitter 1 by any well-known method.

Assume for purposes of this explanation that the bearing reference signal modulates the transmitter 1 by means of frequency modulation. Hence, at the receiving antenna 6 a complex waveform is received, consisting of the radio frequency carrier, frequency modulated with the bearing reference signal, and amplitude modulated with both fundamental and third harmonic sine waves of equal amplitudes. The phase of the fundamental with respect to the bearing reference signal depends upon the bearing of the range antenna 2 from the receiving antenna 1. This phase angle is the azimuth bearing angle. The receiver 7 has two output circuits, an FM bearing reference signal circuit and an AM fundamental and harmonic circuit. The FM output is passed through filter 8 and led to a phase shifting device 9. The sinusoid is limited by the wave shaper 10 thus producing a square wave, and a single pulse is derived from the square wave by a pulse generator 11. This pulse causes the momentary closing of a relay 12 for the purpose of sampling the fundamental and third harmonic voltages passed through the fundamental filter 13 and the third harmonic filter 14 in the AM circuit. It is understood that the sampling device could similarly be a rotating contactor driven synchronously with the reference sinusoid. The fundamental voltage sample is stored on a condenser 16, and the third harmonic voltage is stored on a condenser 15, and the potential difference is measured by a high impedance voltmeter 17. The fundamental wave voltage above ground is measured by a high impedance voltmeter 18, and the third harmonic voltage above ground is measured by a high impedance voltmeter 19. The fundamental signal voltage is led to a square law amplifier 20, and the third harmonic signal's voltage is led to a square law amplifier 21. A high impedance voltmeter 22 is placed to measure the difference between one-half the square of the amplitudes of the bearing data signals in the fundamental and third harmonic frames $$\frac{1}{2}(E_1^2-E_3^2)$$

To obtain the azimuth of the source of radiation free of any error due to a major reflection, the time sampling of the voltages of the fundamental and third harmonic frames is varied by rotating the phase shifter 9 until the potential of the fundamental wave above ground is at a maximum positive voltage as indicated on the voltmeter 18. The error due to any major reflection will be present in this reading. Next the phase shifter 9 is rotated until the potential of the third harmonic above ground is at a maximum positive voltage as indicated on voltmeter 19. Since the third harmonic will have three positive maximums 120° apart, the ambiguity of the harmonic reading is eliminated by first reading the maximum positive voltage above ground of the fundamental, which will have only one maximum. Since the third harmonic maxima are 120° apart, it is clear that to read meter 19, phase shifter 9 will not have to be rotated more than 60° in either direction. This setting of phase shifter 9 will reduce the error of the reading due to any single major reflection by the order of the harmonic wave. In this case the error will be one-third of that present when the reading of the maximum positive voltage of the fundamental is taken. After obtaining the maximum positive voltage of the harmonic wave, phase shifter 9 should be rotated a small amount in either direction until meter 17 reads the same as meter 22; this will cancel any error due to any single major reflection. The two prior operations are necessary to prevent an ambiguous reading. At this point, the setting of phase shifter 9, if the scale reads directly in degrees of phase advance, is exactly equal to the bearing of the source of radiation from transmitting antenna 2, despite any single major reflection that might normally introduce a large bearing error.

If $\omega_c$ is the carrier frequency and $\omega_m$ is the modulation frequency and $\phi$ is the bearing of the transmitter from the receiver, then the received signal $E_S$ is:

$$E_S = E(\sin \omega_c t)[2+\sin(\omega_m t+\phi)+\sin 3(\omega_m t+\phi)]$$

For a reflection at angle $\theta$ of a magnitude KE, the received reflection signal $E_R$ is:

$$E_R = KE(\sin \omega_c t)[2+\sin(\omega_m t+\theta)+\sin 3(\omega_m t+\theta)]$$

The total received signal $E_T$ at the receiver site will be:

$$E_T = E_S + E_R = E(\sin \omega_c t)[2(1+K)+\sin(\omega_m t+\phi) +K\sin(\omega_m t+\theta)+\sin 3(\omega_m t+\phi)+K\sin 3(\omega_m t+\theta)]$$

After demodulation in the receiver, the output of filter 13 tuned to $\omega_m$ will be:

$$\sin(\omega_m t+\phi)+K\sin(\omega_m t+\theta)$$

The output of filter 14 tuned to $3\omega_m$ will be:

$$\sin 3(\omega_m+\phi)+K\sin 3(\omega_m t+\theta)$$

Figure 2:
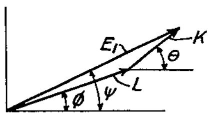
FIGS. 2 and 3 show the voltage vector relationships used in explanation of this invention.

Referring now to FIG. 2, which shows the voltage vector relationship in the fundamental wave's frame, the two signal components passed by the filter 13 are shown in FIG. 2 as "L" at the bearing angle $\phi$ and "K" at the angle $\theta$. These total to the actual sinusoid seen at the output of filter 13, $E_1$ at an angle $\psi$.

Figure 3:
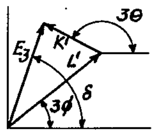

Referring now to FIG. 3, the two signal components passed by filter 14 as shown as "L′" at the angle $3\phi$ and "K′" at the angle $3\theta$. These total to the actual sinusoid seen at the output of the filter 14, $E_3$ at the angle $\delta$.

By the law of cosines, the $\omega_m$ frame:

$$K^2 = 1+E_1^2-2E_1\cos(\psi-\phi)$$

and the $3\omega_m$ frame:

$$K'^2 = 1+E_3^2-2E_3\cos(\delta-\phi)$$

Since the fundamental and harmonic amplitudes are set equal, the two equations may be set equal and:

or $$K^2-1 = E_1^2-2E_1\cos(\psi-\phi) = E_3^2-2E_3\cos(\delta-3\phi)$$

$$\frac{E_1^2-E_3^2}{2} = E_1\cos(\psi-\phi)-E_3\cos(\delta-3\phi)$$

Referring now to FIG. 1, it is seen that voltmeter 22 measures the left-hand term:

$$\frac{E_1^2-E_3^2}{2}$$

one-half the difference of the squares of the fundamental and harmonic voltages. Voltmeter 17 measures the right-hand term of the above equation:

$$E_1\cos(\psi-\phi)-E_3\cos(\delta-3\phi)$$

or the difference between the fundamental voltage above ground and the harmonic voltage above ground. It is necessary to observe the correct polarity for both meters, as shown in FIG. 1, either the fundamental or the harmonic channel being positive, not both, as required in the above expression.

Since the phase shifter 9 shifts the time of sampling, the phase shift will be one to one on the fundamental scale and three to one on the third harmonic scale, hence the voltmeter 17 reads the correct quantities.

Figure 4:
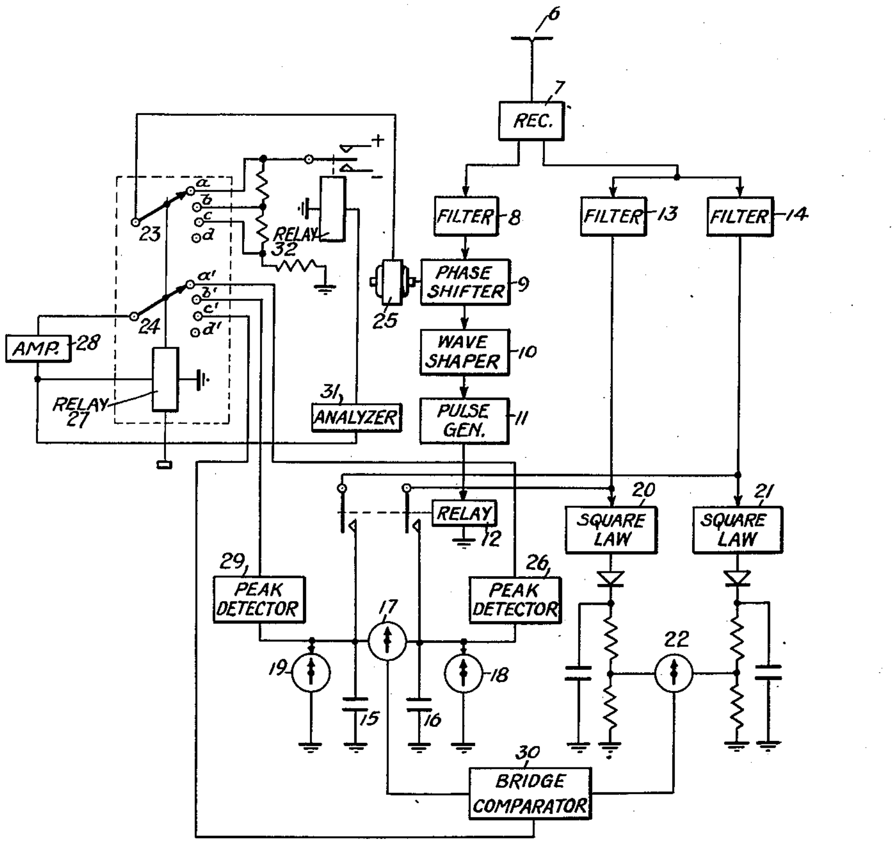
FIG. 4 is a schematic illustration partly in block form of another embodiment showing an automatic system embodying this invention.

The above system can be made to give a direct reading free of any error due to any major reflection, automatically, by the addition of a simple controlled circuit as is shown in FIG. 4, wherein the same reference characters have been used for the corresponding elements of FIG. 1.

The control circuit includes selector switches 23 and 24 which determine operation of motor 25 for control of phase shifter 9. When the selector switches 23 and 24 are in positions *a* and *a′* as shown, the motor 25 runs at the scan speed which is its fastest running speed.

When meter 18 indicates a maximum, as determined by peak detector 26, a stepping relay 27 is activated after the peak indication is amplified by amplifier 28, and the relay moves the selector switches 23 and 24 to positions *b* and *b′*, respectively. In this position, the motor 25 runs more slowly, and the phase shifter is restricted to scanning plus or minus 60° of rotation. When meter 19 indicates a maximum as determined by peak indicator 29, it actuates the stepping relay 27 which moves the selector switches 23 and 24 to positions *c* and *c′*, respectively. The voltage reading of meter 22 minus meter 17, as determined by such a device as a bridge comparator 30, is used as an error signal to drive motor 25 until the voltage readings of meter 17 and meter 22 are equal. Then the relay 27 actuates switches 23 and 24 to positions *d* and *d′*, respectively, where the drive motor 25 stops and the bearing of the transmitter is indicated directly by the position of the phase shifter 9, the scale being calibrated directly in degrees of phase advance. The direction of rotation of the motor 25 in the above operations is determined by the analyzer 31 and the relay 32. The signals fed to analyzer 31 and relay 27 are first amplified by an amplifier 28.

Many variations in the structure to obtain results in accordance with the principles of my invention will occur to those skilled in the art. Accordingly, the description of the specific systems set forth in this application is not to be considered as any limitation of my invention as set forth in the objects thereof and the accompanying claims.

I claim:

1. A system for indicating the true bearing of a signal source comprising a carrier frequency modulated with a bearing signal and amplitude modulated with a fundamental frequency and one of its harmonics, said fundamental and said harmonic having a predetermined amplitude relationship, when the received signal from such source includes both the radiated signal and a reflection of the radiated signal, comprising a receiver to separate the bearing signal, the fundamental and harmonic signals, amplifier means to square the amplitudes of the fundamental and harmonic signals, a first means to measure one-half the difference of the square of the fundamental signal and the square of the harmonic signal, a second means to measure the amplitude difference of the fundamental and harmonic signals, and a bearing indicator having means for changing the phase timing of said second means with respect to said bearing signal to obtain a difference measurement for said second means corresponding to the difference measurement of said first means.

2. A system for indicating the true bearing of a source of radiation emitting a rotating cardioid signal pattern with a cophasal harmonic ripple such that the amplitude of the fundamental and harmonic waves are in a given ratio, and a bearing reference signal modulation, comprising a receiver including means to separate said bearing reference signal, the fundamental and harmonic waves, means controlled by said bearing reference signal to measure samplings of the instantaneous voltage of the fundamental and harmonic waves, means to measure the difference of said instantaneous voltages, means to square the fundamental and harmonic voltages, means to measure one-half the difference of the square voltages, means to vary the phase of the received bearing reference signal to vary the time sampling of said instantaneous voltages whereby when the last two mentioned voltage measurements are equal, the phase of the bearing reference signal will indicate the true bearing of the signal radiation free of any error due to any one major reflection.

3. A system according to claim 2, wherein said means to separate the bearing reference signal, fundamental and harmonic waves includes a filter network to feed the said signal and said waves to a bearing reference signal circuit and to fundamental and harmonic frames.

4. A system according to claim 2, which further includes, when the ratio of the fundamental to harmonic waves in the transmitter is of a ratio other than unity, a voltage amplifier to multiply the filtered harmonic signal voltage by the inverse ratio of the fundamental to harmonic ratio in the transmitter.

5. A system according to claim 2, wherein the means controlled by said bearing reference signal comprises a double-pole, single-throw relay whereby the instantaneous voltages of the fundamental and harmonic waves is measured.

6. A system according to claim 2, wherein said means to measure the difference of said instantaneous voltages comprises a relay, a voltmeter which when said relay is closed will be connected between the harmonic and fundamental voltages whereby the said voltmeter will measure the difference of the instantaneous voltage of the fundamental and harmonic waves.

7. A system according to claim 2, wherein the means to measure one-half the differences of said squared voltages comprises a square law amplifier to square the voltage of the fundamental wave, a square law amplifier to square the voltage of the harmonic wave, a pair of voltage dividers connected to the output of said square law amplifiers, and a voltmeter connected to said voltage dividers whereby one-half the difference of the output of said square law amplifiers is measured.

8. A system according to claim 2, wherein the means to vary the phase of the received bearing reference signal to vary the time sampling of said instantaneous voltages comprises a phase shifter, a calibrated dial operatively connected to said phase shifter whereby the true bearing may be read directly from said calibrated dial.

9. A system according to claim 2, which further includes a phase shaper, a pulse generator to derive pulses from the waveform output of said wave shaper and a relay activated by said pulses whereby the instantaneous voltages of the fundamental and harmonic waves may be read.

10. A system for indicating the true bearing of a source of radiation emitting a rotating cardioid signal pattern with a cophasal harmonic ripple such that the amplitude of the fundamental and harmonic waves are in a given ratio, and a bearing reference signal modulation, comprising a receiver to separate the fundamental and harmonic waves and the bearing reference signal, means controlled by the timing of the said received bearing reference signal to measure the instantaneous voltages of the fundamental and harmonic waves, means to measure the difference of said instantaneous voltages, means to square the fundamental and harmonic voltages, means to measure one-half the difference of said square voltages, a bearing indicator having means to vary the phase relation of the received bearing signal to the fundamental signal wave and thereby vary the time of sampling of said instantaneous voltages until the last two mentioned voltage measurements are made equal, whereby the position of said bearing indicator indicates the true bearing of the source of radiations free of any error due to a major reflection.

11. A system according to claim 10, wherein the last mentioned means includes a motor adapted to run at a given scanning speed, a phase shifter to shift the phase relation of the received bearing reference signal to the fundamental signal wave operatively connected to said motor, means to reduce said motor speed when a peak fundamental voltage signal is received, means to further reduce said motor speed when a peak harmonic voltage signal is received, means to halt said motor when one-half the difference of the squares of the fundamental and harmonic voltages is equal to the difference of the fundamental and harmonic voltages, indicator means associated with said phase shifter whereby the true bearing of the source of radiations is read.

12. A system according to claim 11, wherein said means to halt said motor comprises a bridge comparator whereby a relay is activated to disconnect the source of power to said motor when the difference of the fundamental and harmonic voltages is equal to one-half the difference of the squares of the fundamental and harmonic voltages.

References Cited in the file of this patent

UNITED STATES PATENTS

| | | |
|---|---|---|
| 2,444,439 | Grieg et al. | July 6, 1948 |
| 2,462,853 | Frum | Mar. 1, 1949 |
| 2,485,612 | Labin et al. | Oct. 25, 1949 |
| 2,495,766 | Reade | Jan. 31, 1950 |
| 2,565,506 | Litchford | Aug. 28, 1951 |